United States Patent
Rijpers et al.

(10) Patent No.: US 7,260,822 B2
(45) Date of Patent: Aug. 21, 2007

(54) OPTICAL DATA STORAGE MEDIUM AND USE OF SUCH A MEDIUM

(75) Inventors: Johannes Cornelis Norbertus Rijpers, Eindhoven (NL); Jan Johannes Van Den Broek, Eindhoven (NL); Hermanus Henricus Josephus Wilting, Eindhoven (NL); Roel Van Woudenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/479,556

(22) PCT Filed: Jun. 4, 2002

(86) PCT No.: PCT/IB02/02023

§ 371 (c)(1),
(2), (4) Date: Dec. 3, 2003

(87) PCT Pub. No.: WO02/099798

PCT Pub. Date: Dec. 12, 2002

(65) Prior Publication Data

US 2004/0148623 A1 Jul. 29, 2004

(30) Foreign Application Priority Data

Jun. 7, 2001 (EP) .................... 01202179

(51) Int. Cl.
*G11B 7/24* (2006.01)
(52) U.S. Cl. ..................................... 720/718
(58) Field of Classification Search ............... 720/718; 369/288, 13.55; 430/270.19, 270.11
See application file for complete search history.

(56) References Cited

U.S. PATENT DOCUMENTS

| 4,961,077 A | 10/1990 | Wilson et al. ............... 346/1.1 |
| 5,671,202 A | 9/1997 | Brownstein et al. ........... 369/58 |
| 5,708,486 A * | 1/1998 | Miyawaki et al. ............. 349/44 |
| 5,871,881 A * | 2/1999 | Nishida et al. ......... 430/270.11 |
| 6,418,091 B1 * | 7/2002 | Hirokane et al. ......... 369/13.55 |
| 2002/0025491 A1 * | 2/2002 | Morishima et al. ..... 430/270.19 |
| 2004/0196779 A1 * | 10/2004 | Aratani et al. .............. 369/288 |

FOREIGN PATENT DOCUMENTS

EP 962429 A1 * 12/1999
JP 06150414 A * 5/1994

* cited by examiner

*Primary Examiner*—Tianjie Chen
(74) *Attorney, Agent, or Firm*—Michael E. Belk

(57) ABSTRACT

The optical data storage medium (20) has a substrate (1) with a surface area having tracks (4) of marks representing stored information. The information is readable by means of a scanning radiation beam (10). A reflective layer (2) is present, reflecting the radiation beam (10). The medium has a radiation beam (10) reflection larger than 50%. The reflective layer (2) comprises a compound of the formula $Al_{100-y}X_y$, in which formula Al is aluminum and X is an element selected from the group of Ge and Si. The letter y is the atomic fraction of X in at. %. The value of y is in the range $5<y<35$. The reflective layer (2) has a radiation beam absorption, which enables controlled ablative recording or solid-phase change recording of an identification mark (6, 6').

20 Claims, 2 Drawing Sheets

OPTICAL DATA STORAGE MEDIUM AND USE OF SUCH A MEDIUM

The invention relates to an optical data storage medium, comprising a substrate with a surface area having tracks of marks representing stored information that is readable by means of a scanning radiation beam, a reflective layer reflecting the radiation beam, the medium further having a radiation beam reflection larger than 50%.

The invention also relates to the use of such an optical data storage medium for recording of an identification mark.

An embodiment of an optical data storage medium of the type mentioned in the opening paragraph is known from U.S. Pat. No. 4,961,077. In this patent data is retrieved through the interaction of a radiation beam with the optical data storage medium. The medium is manufactured with the information stored thereon, generally in the form of embossed depressions or pits formed into a polycarbonate substrate. A reflective layer is deposited on the polycarbonate substrate and the radiation beam is focused on the reflective layer. This type of medium is frequently referred to, in the disk embodiment, as a read only memory (ROM) disk. In order to provide copy protection security for the information stored on an optical data storage medium, from now referred to as a medium, a need has been felt for a technique for providing a medium with an identification mark. Optically readable patterns are written outside the data recording area of the recording layer. The patterns are readable with the naked eye or by machine and may serve as an identification mark. This identification mark is applied to every piece of medium, e.g. optical disk. The identification mark may, for example, be a bar code, representing a serial number. The identification mark further includes such things as serial numbers, lot numbers, logos, vendor identification, distributor information, decorative patterns, names, signatures, volume and issue numbers, edition numbers, dates and the like. During recording of copy-protected content, the data is encrypted with a key that is based on this identification mark. This prevents so-called bit copying or cloning of the disk.

In U.S. Pat. No. 4,961,077 a method for affixing an optically readable pattern upon the non-information areas of a ROM disk is described. A relatively high power laser beam, e.g. a YAG laser, at a sufficiently high power level is used to form a series of holes in the reflective metal layer corresponding to the optically readable pattern. The reflective layer may, e.g., be of Al, Pt, Au, Ag, Cu. These metals exhibit a relatively high optical reflection and hence low absorption of laser light. A transparent protective layer, with a thickness of 0.1-0.3 mm, usually covers the reflective layer.

The patterns are written by ablation, meaning that patterns are formed irreversibly by partial removal of material of the reflective layer, e.g. complete evaporation, ejection or flow of molten metal radially outward from the radiation beam center or combinations thereof. Debris or damage in adjacent layers, such as the protective cover layer or substrate, may be caused when metal rests redeposit, recondensate or when molten metal is spread vigorously. The protective coating is usually a spincoated transparent resin, which is solidified by curing with UV-light or heat. The marking process is extremely sensitive to the energy level of the laser beam, too small an energy level in the laser beam not providing an identifiable marking, while too much energy can disrupt the protective cover layer or the substrate. In U.S. Pat. No. 5,671,202 it is stated that by applying the identification mark to the reflective layer prior to the curing or of the protective coating or prior to the application of the protective overcoat itself disruption of the protective coating is counteracted.

It is a disadvantage of the known medium that the radiation beam power, e.g. a laser, required for writing an identification mark is relatively high. A relatively expensive high power radiation beam source is needed. Control of the optimal amount of absorbed radiation is difficult. Furthermore ablation of the reflective layer may still give rise to debris being deposited in the recorded information area. This may cause an increased noise level during read out of the information.

It is an object of the invention to provide an optical data storage medium of the kind described in the opening paragraph with a reflective layer suitable for writing an identification mark in a controlled manner using a radiation beam of relatively low power.

This object is achieved in that the reflective layer comprises an alloy of the formula $Al_{100-y}X_y$, in which formula Al is aluminum and X is an element selected from the group of Ge and Si, and y the atomic fraction of X in at. % where $5<y<35$.

Due to the presence of Ge or Si, the absorption of the radiation beam power in the reflective layer is relatively high. When using a radiation beam source, e.g. a laser, which is focused onto the reflective layer, the absorbed energy in the focal point may cause a rapid increase of temperature of the reflective layer. Depending on the power density of the focused radiation beam and the properties of the reflective layer the material may rise in temperature and change solid state, melt, evaporate or be ejected. In the first case, when the material is heated but below its melting point a change of solid state may occur, e.g. amorphous to crystalline, and crystalline identification marks are formed in the exposed areas of the reflective layer. In the second case the molten material, after turning off or moving the radiation beam power, will rapidly cool down. Quenching takes place of the material of the reflective layer causing the formation of amorphous identification marks in the exposed areas of the reflective layer. In the other cases identification marks in the shape of holes or dents are formed in the reflective layer. All these identification marks exhibit an optical reflection, which may be different from their surroundings depending on the solid state of the surroundings or the depth of the holes or dents. This enables the identification marks to be distinguished by optical reading means or even by the naked eye, the latter provided that the identification marks are large enough. Reflection differences of more than 10% compared to areas with no identification marks may be obtained which are easily distinguished. For values of y of 35 or larger the reflection of the reflective layer becomes lower than 50%, which may cause compatibility problems with existing optical disk standards. For values of y of 5 and smaller the radiation beam absorption of the reflective layer is relatively low and writing an identification mark in a controlled manner becomes relatively difficult.

In an embodiment X is the element Ge. Ge is a widely used material and is easy to apply in combination with Al by e.g. sputtering.

In a favorable embodiment the value of y is smaller than 16. This has the advantage that the radiation beam reflection of the reflective layer is higher than 70%, which is required in order to be compatible with the CD red book standard. This standard requires the reflection and substrate transmission, measured double pass, of a CD audio or CD-ROM disk to be higher than 70% in a blank area. The CD system according to the red book standard is optimized for a radiation beam wavelength between 770 and 830 nm, e.g. a 780 nm semiconductor laser may be used as a radiation source. Present developments are directed towards optical recording systems using radiation beams with shorter wavelengths, e.g. 680 nm and even 405 nm. Use of these shorter wavelengths is explicitly not excluded from the scope of the present invention.

It is favorable that the reflective layer has a thickness in the range of 10-100 nm. When the reflective layer is too thin, e.g. thinner than 10 nm, the optical transmission of the layer is too high, resulting in a too low reflection of the reflective layer. A thick layer, e.g. thicker than 100 nm, is more expensive because the production time and material costs are unnecessarily increased. A thicker layer does not pose an advantage over a layer of e.g. max 100 nm, which generally already is completely optically closed.

In another embodiment an identification mark is present in the reflective layer, said identification mark having a radiation beam reflection value different from the radiation beam reflection value of an unmarked area of the reflective layer. During production of the medium the medium may be provided with an identification mark, which may be written with a relatively low power and inexpensive laser. The identification mark may be a unique number, which is different for each produced disk, or a more general number denoting an identification for the content of the data present on the disk. Usually such an identification number is positioned within a radius where the data area starts, e.g. in the form of a barcode or man readable number. The identification mark has a reflection, which is different from its surroundings and may therefore be read optically, by a device or human vision.

In another embodiment the identification mark is present between the tracks of marks. Due to the relative low modulation, compared to the modulation of the CD data marks, the identification mark may be written and read out between the tracks of marks with CD data. In ROM applications the marks often comprise pits, i.e. physical indentations. The area between the tracks is usually referred to as 'on land'. The writing may e.g. be performed during production of the CD disk in a recorder which is suitable for 'on land' recording. Read out of an identification mark that is present between the tracks generally has to be performed with a radiation beam spot, e.g. a focused laser, that is tracking in 'on land' mode. The 'on land' read out feature is relatively easy to implement in CD reproduction equipment, e.g. a CD player. The advantage of having an identification mark written between the tracks 'on land' is that no extra radial space is required outside the CD data area and that a relatively small radial area is used in the data area in which the identification mark is written. This is because the identification mark is written and read out in tracking mode. Theoretically, 'on land' writing of an identification mark in, e.g., one revolution between two adjacent tracks may be sufficient. In this way the identification mark will be not or hardly noticeable by the human eye. Read out of such a one-revolution identification mark must be performed by machine. The possible interference of read out of the identification mark and read out of the track of marks of CD data may be minimized by writing the identification mark in an area where tracks of marks are present, but where no content is present. Most CD disks on the market do not contain the full possible playing length of data. Usually the CD disk at the outer radius only contains a CD track, without actual content, in order to give the disk a better cosmetic appearance. This area may, e.g., be suitable for recording an 'on land' identification mark without the risk of any interference between CD data and the identification mark. The previous description refers to CD disks and CD players in particular. However the invention may also apply to other types of newer generation optical media and players, like ROM versions of DVD and DVR, which therefore are explicitly not excluded.

In an embodiment the identification mark is formed by partial removal of material of the reflective layer. By partial removal is meant a mechanism by which holes or thinnings are formed in the reflective layer. The heating of the reflective layer by a radiation beam may cause the material of this layer to evaporate or eject leaving a hole. However it is also possible that molten material flows radially outward leaving a hole with a rim or a thinner part in the reflective layer. Furthermore combinations of the evaporation/ejection and outward flow mechanism are possible. It generally is preferred to dose the radiation beam energy such that no or very little debris is formed during the formation of the identification mark meaning that relatively very high powers should be avoided. Very high power in this context means enough power to melt, boil and evaporate the reflective layer. With a reflective layer according to the invention very high radiation beam powers are avoided because of the relatively high absorption of the reflective layer, which allows optimal dosing of the radiation beam energy in a better controlled identification mark formation process.

In an alternative embodiment the identification mark is formed by a solid state transformation of material of the reflective layer. A known solid state transformation is so-called phase-change of alloys. Phase change optical recording involves the formation of amorphous/crystalline recording marks in a crystalline/amorphous reflective layer using a focused relatively high power radiation beam. High power in this context means enough power to melt the reflective layer when writing amorphous marks or enough power to rapidly crystallize the reflective layer when writing crystalline marks. During recording of an amorphous identification mark in a crystalline reflective layer, the medium is moved with respect to the focused radiation beam that is modulated in accordance with the information to be recorded. Note that the term in accordance with does not imply that radiation beam modulation duty cycle during writing is exactly equal to the desired duty cycle of the identification mark during read out. E.g., when a series of identification marks is desired with a duty cycle of 50% this may be realized by modulating the radiation beam with a duty cycle of $7/16$ or even a short series of pulses alternated with pauses. This generally is called write strategy. Indentification marks are formed when the high power radiation beam melts the reflective layer. When the radiation beam is switched off and/or subsequently moved relatively to the reflective layer, quenching of the molten identification marks takes place in the reflective layer, leaving an amorphous identification mark in the exposed areas of the reflective layer that remains unchanged in the unexposed areas. Erasure of written amorphous identification marks is realized by recrystallization through heating with the same laser at a lower power level, without melting the reflective layer. A plurality of amorphous identification marks may form a larger identification mark, which can be read, e.g. via the substrate, by a relatively low-power focused radiation beam. Reflection differences of the amorphous identification marks with respect to the unchanged reflective layer bring about a modulated radiation beam which is subsequently converted by a detector into a modulated photocurrent in accordance with the recorded indentification mark. During formation of crystalline identification marks in an amorphous reflective layer the amorphous reflective layer must be heated to a temperature just below its melting point. This causes the reflective layer to change to the more stable crystalline phase. This solid-phase change generally even occurs at room temperature but is extremely slow at such low temperatures. By rising the temperature of the reflective layer to just below its melting temperature crystallization practically occurs instantaneously. In analogy with the amorphous identification mark formation as described above, write strategies may be applied.

Embodiments of the data storage medium according to the invention will be described with reference to the drawings. It should be noted that drawings are not to scale. For instance pit dimensions and track distances are drawn much larger than they generally are. Further tracks are schematically drawn concentrically shaped but are generally spirally shaped.

IN THE DRAWINGS

FIG. 1 schematically shows the top view of the data storage medium according to the invention.

Figure 1:
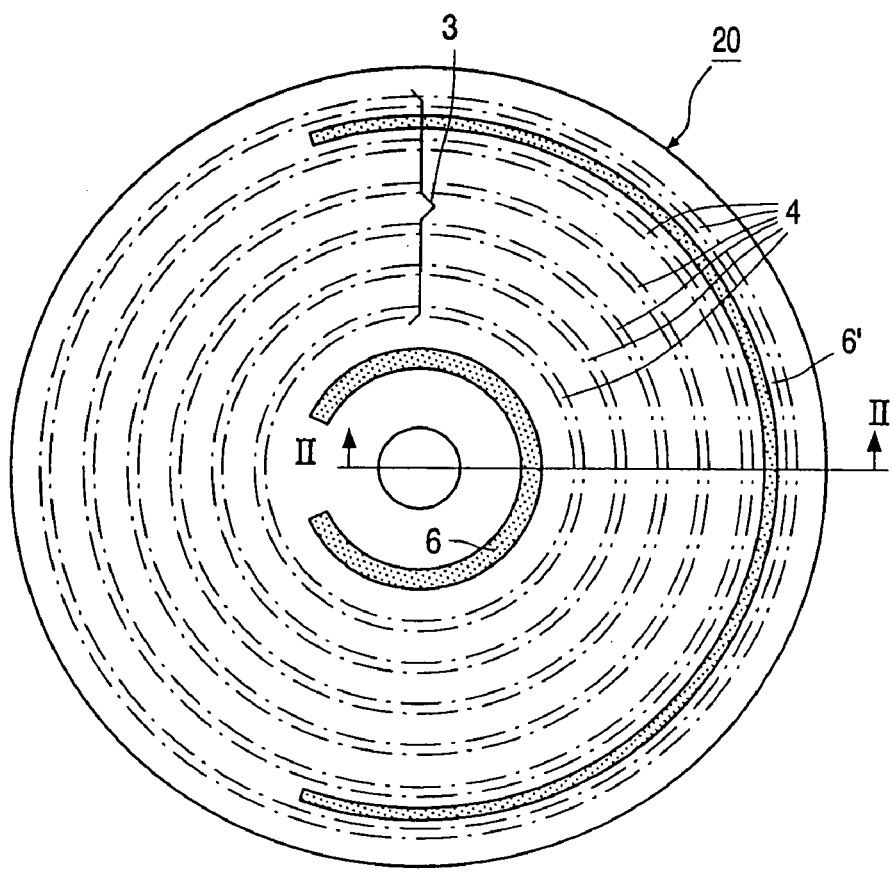
Figure 2:
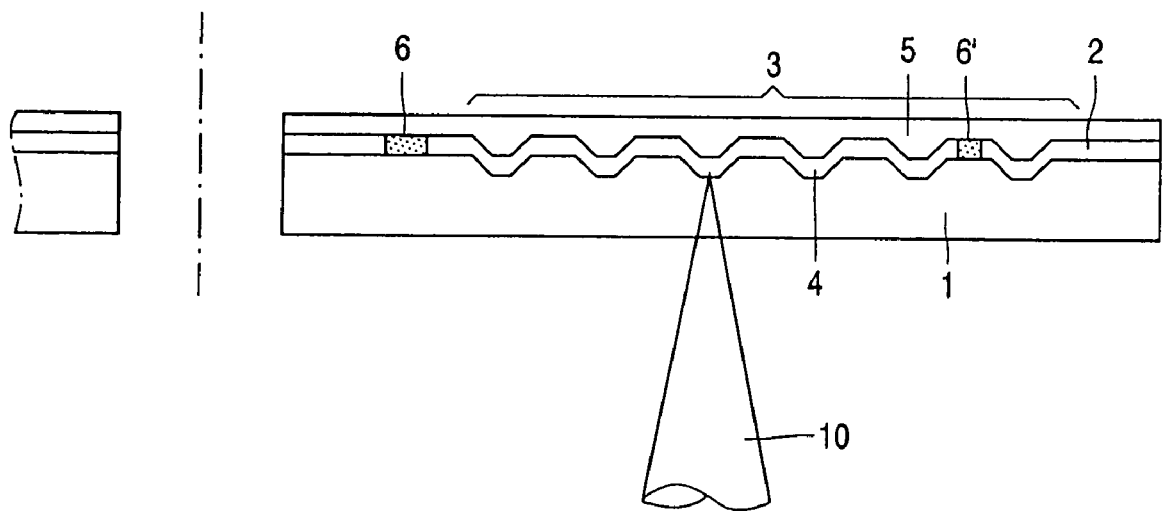
FIG. 2 shows a cross section along the line II-II as indicated in FIG. 1 of an embodiment of the data storage medium.

In FIGS. 1 and 2 an optical data storage medium 20 is shown. The medium has a substrate 1, with a surface area 3 having tracks 4 of marks, i.e. pits, representing stored information that is readable by means of a scanning radiation beam 10. A radiation beam reflective layer 2 is present. The medium 20 has a radiation beam reflection of 58%, which was measured with a focused radiation beam in an actual optical disk player. The radiation beam 10 has a wavelength of 780 nm. The radiation beam 10 is focused with an NA of 0.50. The reflective layer 2 comprises an alloy of the formula $Al_{72}Ge_{28}$ and has a thickness of 50 nm.

Figure 4:
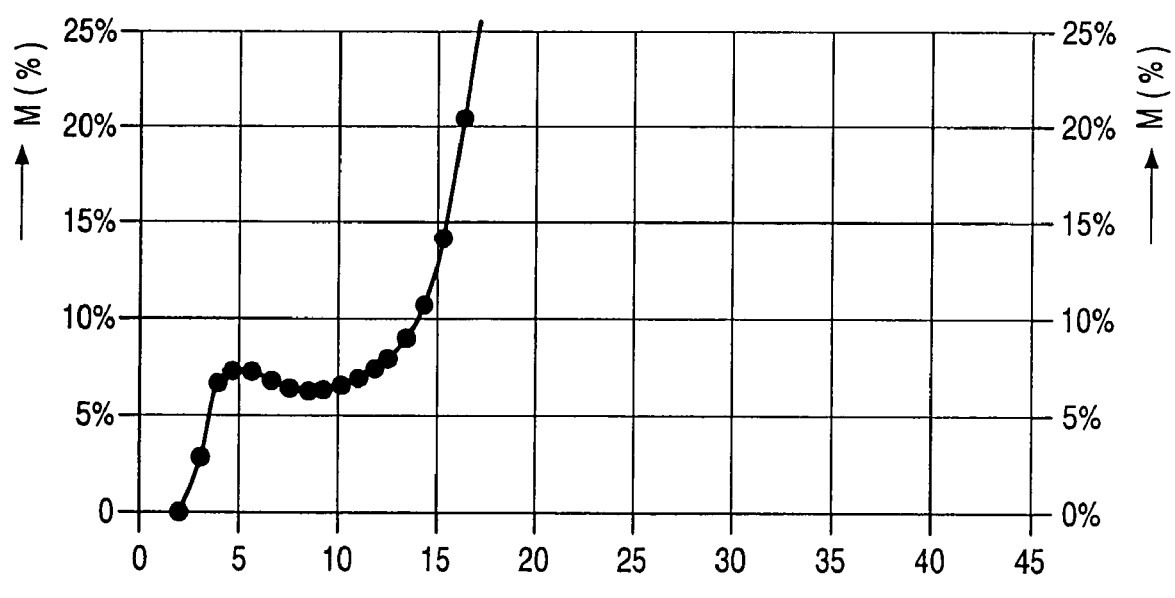
FIG. 4 shows a graph of the optical modulation M of an identification mark versus the radiation beam write power (in mW) using an $Al_{72}Ge_{28}$ reflective layer.

An identification mark 6 or 6' is present in the reflective layer 2. The identification mark 6 or 6' has a radiation beam reflection value different from the radiation beam reflection value of an unmarked area of the reflective layer 2. The reflection $R_m$ of the identification mark 6 or 6' depends on the radiation power used during writing of the identification mark 6 or 6'. In FIG. 4 the modulation of the identification mark is represented as a function of the radiation beam power. In this case a 780 nm semiconductor laser is used, focused with an NA of 0.50. Marks are written using a single tone carrier of 720 kHz with a duty cycle of 7/16 at a radiation beam velocity relative to the medium of 2.4 m/s. The modulation M is defined as $M=|R_m-R_r|/R_{max}$ in which formula $R_m$ is the value defined above and $R_r$ is the reflection of an unmarked area of the reflective layer outside the tracks 4 of marks and $R_{max}$ is the maximum value of either $R_r$ or $R_m$. Modulation type can be so-called high-to-low in which case $R_m$ is lower than $R_r$ or low-to-high when $R_m$ is higher than $R_r$. Since the definition of the modulation contains the absolute value of the difference of $R_m$ and $R_r$ the modulation is always positive. In FIG. 4 the modulation M sharply increases to a value of about 7% at a laser power of 3 mW and then remains substantially constant until a laser power value of 13 mW whereafter another sharp increase in modulation occurs. It is noted that the large modulations that are obtained at laser powers above 13 mW can be attributed to ablative writing. The modulation type of the latter is low-to-high.

In the embodiment of FIGS. 1 and 2 an identification mark 6' is present between the tracks 4 of marks, i.e. pits. The identification mark 6' is written 'on land'. Read out of the pits of the tracks 4 is still possible since the modulation of the identification mark 6 or 6' generally is lower than the modulation of the pits of the tracks 4. The information written in the identification mark generally has a lower tangential density than the regular pits, e.g. three times as low. The reflective layer may be deposited by sputtering techniques, which are well known in the art. A thus deposited layer generally has an amorphous structure.

The identification mark 6' is formed by a solid state transformation of the material $Al_{72}Ge_{28}$ of the reflective layer, i.e. amorphous to crystalline. This identification mark 6' is written by a high power laser of the kind that is used in rewritable recording, but with the laser tracking in 'on land' mode. By writing the identification mark at a laser power of 5 mW a modulation of 7% is obtained according to the formula defined above.

The identification mark 6 is formed by a solid state transformation of the reflective layer material. This identification mark 6 may be written in a production apparatus called an initializer, in which a laser beam scans and heats the reflective layer 2, which moves relatively to the laser beam, to a temperature below its melting temperature but above its crystallization temperature, causing the amorphous reflective layer 2 to crystallize. This production apparatus crystallizes a path that has a radial width of many tracks 4. This apparatus is generally used for the production of rewritable phase change media but may be used for recording an identification mark 6 according to the present invention. At the inner and the outer regions of the disk, e.g. for DVD or CD within a radius of 23.5 mm and beyond a radius of 58.5 mm, the reflective layer of the disk may be partially crystallized by using a pulsed laser beam in the initializer. So an identification mark 6, e.g. bar code pattern or unique disk identification (UDI), may be written outside the data recording area. By starting the pulse sequence locked to the revolution of the disk and rotating the disk in constant angular velocity (CAV) mode, the identification mark 6 is written on the disk. No tracking is used for the laser beam of the initializer during writing of the identification mark 6. Therefore the identification mark 6 maybe slightly eccentric with respect to the tracks 4 of the pits. This does not pose a problem because the identification mark 6 has a relatively large radial width of several tens of millimeters. No tracking is required during read out of the identification mark 6.

Figure 3:
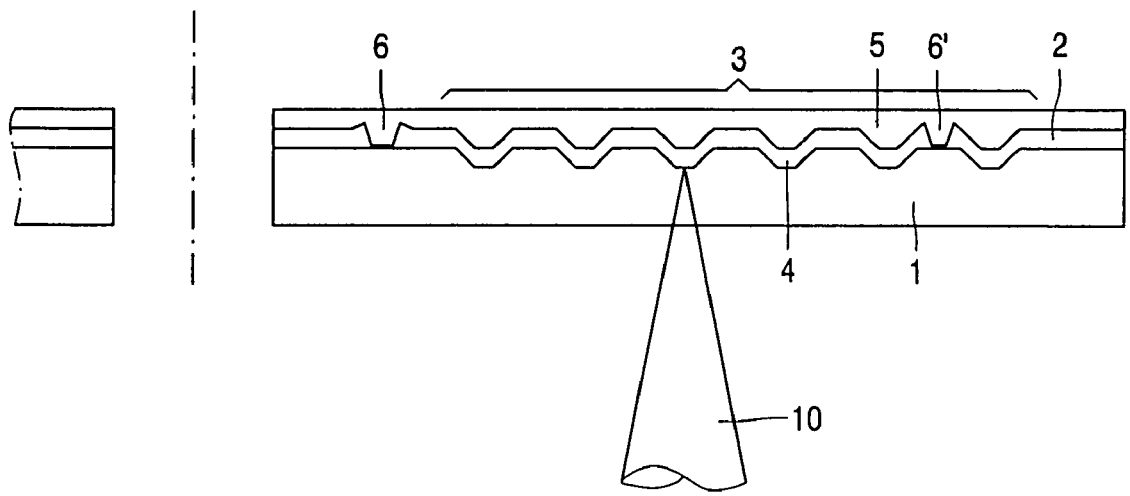
FIG. 3 shows a cross section along the line II-II as indicated in FIG. 1 of another embodiment of the data storage medium.

In FIG. 3 the identification mark is formed by partial removal of material of the reflective layer. In this embodiment it is preferred to write the identification mark 6 or 6' before depositing the protective cover layer 5. This has the advantage that material which is expelled from the hole forming the identification mark 6 or 6' and which is redeposited near the identification mark as debris still may be removed from the disk, e.g. by blowing off or other techniques. In this way interference of the read out signal by debris is counteracted. It even may be possible to write the identification mark with a radiation beam that is focused from the side opposite to the side of the substrate, e.g. through the protective cover layer 5 or through free air when the protective cover layer 5 has not been deposited yet. It is remarked that read out of optical media may be performed through the protective cover layer. This read out method is more and more used for newer high-density media. In this case the cover layer should be of good optical quality with a uniform thickness.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising", "comprise" or "comprises" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an optical data storage medium for read only purposes is provided. The medium has a radiation beam reflection larger than 50%. The reflective layer comprises a compound of the formula $Al_{100-y}X_y$, in which formula Al is aluminum and X is an element selected from the group of Ge and Si and y the atomic fraction of X in at. % where $5<y<35$. The reflective layer has a radiation beam absorption, which enables controlled ablative recording or solid-phase change recording of an identification mark.

The invention claimed is:

1. An optical data storage medium, comprising a substrate with a surface area having tracks of marks representing stored information that is readable by means of a scanning radiation beam, a reflective layer reflecting the radiation beam, the medium further having a radiation beam reflection larger than 50%, wherein the reflective layer comprises an alloy of the formula $Al_{100-y}X_y$, in which formula Al is aluminum and X is Ge, and y is the atomic fraction of X in at. % where $31<y<35$.

2. The optical data storage medium according to claim 1, wherein the radiation beam has a wavelength selected from the range of 770-830 nm.

3. The optical data storage medium according to claim 1, wherein the reflective layer has a thickness in the range of 10-100 nm.

4. An optical data storage medium according to claim 1, wherein an identification mark is present in the reflective layer, said identification mark having a radiation beam reflection value different from the radiation beam reflection value of an unmarked area of the reflective layer.

5. An optical data storage medium according to claim 4, wherein the identification mark is present between the tracks of marks.

6. An optical data storage medium according to claim 5, wherein the identification mark is formed by using a laser power of about 5 mW.

7. An optical data storage medium according to claim 4, wherein the identification mark is formed by partial removal of material of the reflective layer.

8. An optical data storage medium according to claim 4, wherein the identification mark is formed by a solid state transformation of the reflective layer material.

9. Use of an optical data storage medium according to claim 1 for recording of an identification mark.

10. The optical data storage medium of claim 1, wherein the radiation beam reflection is larger than 80%.

11. The optical data storage medium of claim 1, wherein the reflective layer has a thickness in the range of 10-20 nm.

12. An optical data storage medium, comprising:
a substrate having a surface area with marks representing stored information that is readable by a scanning radiation beam,
a reflective layer that reflects at least 80% of the radiation beam,
wherein, the reflective layer comprises an alloy of the formula $Al_{100-y}X_y$, in which formula Al is aluminum and Ge is Germanium, and y is the atomic fraction of Ge in at. % where $5<y<35$.

13. The optical data storage medium according to claim 12, wherein the radiation beam has a wavelength selected from the range of 770-830 nm.

14. The optical data storage medium according to claim 12, wherein the reflective layer has a thickness in the range of 10-100 nm.

15. Use of an optical data storage medium according to claim 12 for recording of an identification mark.

16. An optical data storage medium according to claim 12, wherein an identification mark is present in the reflective layer, said identification mark having a radiation beam reflection value different from the radiation beam reflection value of an unmarked area of the reflective layer.

17. An optical data storage medium according to claim 16, wherein the identification mark is present between the tracks of marks.

18. An optical data storage medium according to claim 17, wherein the identification mark is formed by using a laser power of about 5 mW.

19. The optical data storage medium of claim 12, wherein $30<y<35$.

20. The optical data storage medium of claim 12, wherein the reflective layer has a thickness in the range of 10-20 nm.

* * * * *